(12) United States Patent
Sadeghfam et al.

(10) Patent No.: US 8,285,214 B2
(45) Date of Patent: Oct. 9, 2012

(54) ADJUSTABLE CIRCUIT AND RFID READER DEVICE

(75) Inventors: Arash Sadeghfam, Aachen (DE); Holger Heuermann, Stolberg-Breinig (DE)

(73) Assignee: Pepperl + Fuchs GmbH, Mannheim (DE)

( * ) Notice: Subject to any disclaimer, the term of this patent is extended or adjusted under 35 U.S.C. 154(b) by 884 days.

(21) Appl. No.: 12/400,183

(22) Filed: Mar. 9, 2009

(65) Prior Publication Data

US 2009/0224887 A1  Sep. 10, 2009

(30) Foreign Application Priority Data

Mar. 10, 2008 (DE) .......................... 10 2008 013 468
Mar. 10, 2008 (DE) .......................... 10 2008 013 469

(51) Int. Cl.
*H04B 7/00* (2006.01)

(52) U.S. Cl. .......... 455/41.3; 455/83; 455/84; 455/63.1; 375/346; 375/219; 375/261; 375/340; 340/10.1; 340/572.1; 340/10.3

(58) Field of Classification Search .................... 455/83, 455/84, 41.3; 375/346, 219, 261, 340; 340/10.1, 340/572.1, 10.3
See application file for complete search history.

(56) References Cited

U.S. PATENT DOCUMENTS

| | | | |
|---|---|---|---|
| 6,567,648 B1 * | 5/2003 | Ahn et al. ........................ | 455/83 |
| 6,603,391 B1 * | 8/2003 | Greeff et al. .................. | 340/10.3 |
| 2006/0098765 A1 * | 5/2006 | Thomas et al. ................ | 375/346 |
| 2008/0081551 A1 * | 4/2008 | Posamentier ..................... | 455/1 |

FOREIGN PATENT DOCUMENTS
WO  WO 2006/088583 A2  8/2006

* cited by examiner

*Primary Examiner* — April G Gonzales
(74) *Attorney, Agent, or Firm* — John A. Merecki; Hoffman Warnick LLC

(57) ABSTRACT

The present invention relates to an adjustable circuit for filtering a transmission channel of an RFID signal and for suppressing a carrier signal in the reception path between an input gate and an output gate, including at least one adjustable oscillator for generating an oscillator signal, at least one input mixing stage cooperating with the oscillator for mixing an input signal by means of the oscillator signal to an intermediate frequency and a blocking device arranged downstream of the input mixing stage or the input mixing stages for suppressing the carrier signal at the intermediate frequency.

27 Claims, 4 Drawing Sheets ously. The present invention relates in a first aspect to an adjust-
ADJUSTABLE CIRCUIT AND RFID READER DEVICE

FIELD OF THE INVENTION

The present invention relates in a first aspect to an adjustable circuit for the filtering of a transmission channel of an RFID signal and for the suppression of a carrier signal in the reception path between an input gate and an output gate. In a second aspect the invention relates to an RFID reader device with an inventive circuit.

BACKGROUND OF THE INVENTION

RFID-systems are employed in various fields of automatic identification. Especially in the field of industrial automation the use of RFID-systems proves to be of advantage. The growing requirements of quality management and quality assurance in automatic production can easily be realized with RFID-systems. In the production process production and measurement data can easily be stored on the object itself and taken alongside. In this way the data are available and can be documented on each object at any time. This also allows for a greater flexibility in production. Production parameters can be stored on the object and read out directly in the respective production line. Objects can be removed from the series at any chosen time and added again at a later point in time without any errors being caused. Due to the decentralized data storage on RFID-tags even a breakdown of the central computer does not pose any problem with regard to the clear identification and localization of the objects.

Basically, RFID-systems are distinguished between coupled systems and microwave systems. In the coupled systems data exchange between the reader unit and the tag takes place through capacitive or inductive coupling. As a rule, these systems operate at the frequencies of 135 kHz or 13.56 MHz. In microwave systems a non-reacting, electromagnetic coupling takes place via the far field of an antenna. In this case use is made of the frequency ranges 860-930 MHz, 2.45 GHz as well as 5.8 GHz.

An essential part of the available RFID-systems functions according to the so-called backscatter method. In these systems the reader unit transmits a constant, sinusoidal carrier signal (continuous wave, CW) that supplies energy to the tag. In addition, a part of the carrier signal is reflected on the tag. Through a change of the antenna backscattering characteristics the tag modulates the data to be transmitted onto the carrier signal, in which case the data can then be recognized in the frequency spectrum as sidebands around the signal.

Based on the known equations for field propagation the essential receiving and transmission power of a transmission link can be described as follows:

1. Transmission loss $a_r^{dB}$ in decibel as a function of the distance r and the wavelength $\lambda$ ($\lambda = c/f$):

$$a_r^{dB} = -10 \cdot \log\left(\frac{\lambda}{4\pi r}\right)^2.$$

2. Receiving power according to the tag antenna $P_{te}^{dBm}$ in dBm as a function of the transmission power of the reader unit $P_{rs}^{dBm}$ in dBm, the gain of the transmission antenna $G_s^{dB}$ in decibel, the gain of the tag antenna $G_t^{dB}$ in decibel and the transmission loss $a_r^{dB}$ in decibel:

$$P_{te}^{dBm} = P_{rs}^{dBm} + G_s^{dB} + G_t^{dB} - a_r^{dB}.$$

3. Transmission power of the tag $P_{ts}^{dBm}$ in dBm as a function of the receiving power of the tag and the modulation losses on the tag $P_{mod}^{dB}$ in decibel:

$$P_{ts}^{dBm} = P_{te}^{dBm} - P_{mod}^{dB}.$$

4. Receiving power on the reader unit $P_{re}^{dBm}$ in dBm as a function of the described parameters and:

$$P_{re}^{dBm} = P_{ts}^{dBm} + G_s^{dB} + G_t^{dB} - a_r^{dB}$$
$$= P_{rs}^{dBm} + 2G_s^{dB} + 2G_t^{dB} - 2a_r^{dB} - P_{mod}^{dB}.$$

In addition, a system dynamic D required for the distance can be indicated in decibel by means of the difference between the transmission power $P_{rs}^{dBm}$ and the receiving power $P_{re}^{dBm}$ of the reader unit:

$$D^{dB} = P_{rs}^{dBm} - P_{re}^{dBm}.$$

In the industry standards ISO-IEC 18000-6C and ETSI EN 302 208-1 the stipulated ruling for the UHF RFID-systems is in the frequency range of 860 MHz-930 MHz. In this, a maximum transmission power of 2 W ERP (equivalent radiated power) and the modulation methods to be used are stipulated for example.

Hence, for a link of one meter a transmission loss of approximately 31.2 dB ensues, which increases by a factor of 6 dB with each doubling of the transmission link. Under realistic conditions:

Transmission power 2 W ERP,
Operating frequency 866.5 MHz,
Antenna gain of the reader antenna and the tag antenna of 6 dBi and 1 dBi, respectively,
Modulation losses of 6 dB
and reflection losses of 0.5 dB an input power of approximately −19.7 dBm with a corresponding necessary system dynamic of 55.9 dB as a difference between the transmission power and the receiving power is thereby resultant for this distance. Each doubling of the distance leads to a reduction of the input power by 12 dB with a corresponding requirement of a 12 dB increased system dynamic.

In the backscatter method transmission of the carrier signal and reception of the tag response take place simultaneously (duplex operation). This can be realized by making use of a circulator, as described for example in FIG. 1. In the case of such a circulator crosstalk can occur between the transmission connection and the reception path, which increases upon a decreasing isolation between transmission path and reception path. The amount of crosstalk or of the isolation constitutes a significant system characteristic that contributes considerably to the system dynamic. In commercial circulators the crosstalk lies in the range of 20 to 30 dB.

Crosstalk can also ensue from reflections of the transmission signal on the common transmission/reception antenna, which are passed on by the circulator in accordance with its function to the reception path. Such reflections can be based for example on minor mismatches of the antenna.

As a result of the crosstalk tag responses may be superimposed so that they can no longer be demodulated without error. For this reason measures for reducing the crosstalk have been taken into consideration.

Known approaches for the reduction of the carrier signal level in the reception path are primarily restricted to the suppression of crosstalk between the transmission and the reception path. Such approaches firstly include the use of two separate antennas for transmitting and receiving instead of a circulator and a combined transmitting/receiving antenna. Here, by an optimal arrangement of the individual antennas as well as by application of damping elements at appropriate places of the respective antenna housings, crosstalk between the transmission and the reception path can be further reduced. In practice, values hereby amount to approximately −40 dB.

The disadvantage of this procedure resides in the sensitivity of the crosstalk to environmental influences in the vicinity of the system or the tag. Such environmental influences are e.g. larger reflecting areas which lead to a high transmission factor between the transmission and the reception antenna, which may interfere with the weak tag response as a disturbing signal.

Furthermore the circuit may be expanded by a fixed component connected in parallel, which together with the equivalent circuit parameter of the crosstalk constitutes a resonance circuit with a resonance frequency at the operating frequency. Thus, the crosstalk for the operating frequency may be compensated by some decades, depending on the performance of the component used. This approach may be realized with application of a few SMD components and is inexpensive.

A disadvantage of this procedure initially lies in the invariant frequency range of the compensation whereby the application is restricted to a single frequency. Furthermore, compensation may only be achieved to a small extent on account of the discrete values of the available components. With respect to modifications of the transmitting and/or receiving antenna, the compensation remains comparatively inflexible. The compensation after all is narrow-band for which reason a strong dependency of the absolute frequency position of compensation on the manufacturing tolerances arises. This leads to the fact that the improvement of the isolation actually achieved at the operating frequency can vary considerably.

By using components with variable values such as varactor diodes, a certain flexibility regarding the frequency position and the compensation may be introduced. In practice, values herein are approximately −35 dB.

There are furthermore only a few approaches to carry out a suppression of the carrier signal in the receiving path. By using a digital signal processing, e.g. by DSPs (Digital Signal Processors), a narrow-band suppression of up to −80 dB is possible. Furthermore, when taking this approach frequency selective filters with differing band widths may be realized.

The disadvantage of a digital signal processing on the one hand is the higher requirement for capital expenditure both for the acquisition of hardware and for the development time required for software development as well as the respective costs incurred herein. On the other hand the hardware requires quite some space and is, depending on the respective requirements to be fulfilled, considerably slower than an analogue circuit.

A further possibility to achieve an improved suppression of the carrier signal in the reception path is described in "System combining radio frequency transmitter and receiver using circulator and method for cancelling transmission signal thereof" (U.S. Pat. No. 6,567,648 B1). Herein, a suppression of crosstalk is achieved by decoupling a part of the receiving signal ("Rx+Tx" in FIGS. 3 and 4) and modifying it in phase and amplitude in such a way that the fractions of the carrier signal in the original receiving signal and in this decoupled signal path, the latter having the same amplitude but being shifted in phase by 180°, can be brought together. Herein, a filtering of the Rx-Signals becomes necessary (components 24 in FIGS. 3 and 4), which—due to the small frequency offset between the carrier signal and the tag response in the backscatter procedure in RFID systems—could only be achieved by means of a digital signal processing.

In accordance with the state of the art, merely by digital signal processing the carrier signal can be effectively suppressed for individual channels. The requirements for filtering an individual operating channel are so high (the relative bandwidth in UHF RFID for instance is 0.23%) that in turn only a digital signal processing allows a reliable filtering of an individual operating channel.

Circulators, directional couplers and variable phase shifters are described in U.S. Pat. No. 6,603,391 B1, WO 2006/088583 A2, US 2006/0098765 A1, and US 2008/0081551 A1, respectively.

SUMMARY OF THE INVENTION

The present invention provides an adjustable circuit for the filtering of a transmission channel of an RFID signal and for the suppression of a carrier signal in the reception path between an input gate and an output gate which allows the efficient suppression of the carrier signal with inexpensive means. Furthermore, the present invention provides an RFID reader device which efficiently suppresses the carrier signal with inexpensive means.

An adjustable circuit for the filtering of a transmission channel of an RFID signal and for the suppression of a carrier signal in the reception path between an input gate and an output gate has, in accordance with the invention, at least one adjustable oscillator for generating an oscillator signal. Furthermore, at least one input mixing stage cooperating with the oscillator is provided for mixing an input signal by means of the oscillator signal to an intermediate frequency. Finally, the inventive circuit has a blocking device which is arranged downstream of the input mixing stage or the input mixing stages for suppressing the carrier signal at the intermediate frequency.

A first central idea of the invention can be seen in the fact that for the suppression of a carrier signal at an RFID device with inexpensive means there are no longer—as shown in the state of the art—components provided which are installed for a particular frequency, but rather that a circuit is provided which in principle is adjustable. In this way flexibility can be significantly increased.

A further central idea of the invention can be considered to be the arrangement of an input mixing stage upstream of a particularly high-quality blocking device for the suppression of a carrier signal, the input mixing stage being able to mix an input signal to an intermediate frequency. A fundamental advantage hereby is that because of the high-quality blocking device a particularly efficient suppression of the carrier signal can be achieved and that furthermore—by means of the adjustable oscillator and the input mixing stage—the intermediate frequency can be adjusted to the blocking device in an adequate and suitable manner.

In an embodiment of the inventive circuit the blocking device has a particularly high-performing band-stop filter.

In accordance with a further embodiment, upstream or downstream of such band-stop filter a band-pass filter can be arranged for the filtering of the transmission channel at the intermediate frequency, the band-pass filter and the band-stop filter being coordinated purposefully.

In principle also several band-pass filter can be provided between which it can be switched back and forth. Likewise it is possible to provide a plurality of band-stop filters and band-pass filter assigned thereto, wherein it can be switched over between the individual pairs.

In principle, the signal filtered through the blocking device, i.e. for example through the band-stop filter, can be evaluated at the intermediate frequency. However, to be able to resort to commercially available components for the evaluation of the information sent by the RFID tags, it is preferred to set the output signal to a defined frequency. For this purpose it is preferred to arrange at least one output mixing stage downstream of the band-stop filter.

In a further embodiment of the inventive circuit, supplementary or alternatively to the band-stop filter, the blocking device comprises a first band-pass filter for the filtering of a first sideband of the input signal and a second band-pass filter for the filtering of a second sideband of the input signal. There, a power-divider is advantageously provided for the division of an input signal between a first path and a second path.

An advantageous further development of this embodiment is characterized in that a power divider is provided for the division of an input signal between a first path and a second path, that at least one adjustable oscillator is provided for the generation of a first oscillator signal, that in the first path a first input mixing stage cooperating with the first oscillator is provided for the mixing of an input signal by means of the first oscillator signal to a first intermediate frequency, that the first band-pass filter is arranged downstream of the first input mixing stage for filtering the first sideband of the input signal at the first intermediate frequency, that in the second path a second input mixing stage cooperating with the first oscillator or the second oscillator is provided for mixing the input signal by means of the oscillator signal to a second intermediate frequency and that the second band-pass filter is arranged downstream of the second input mixing stage for filtering the second sideband of the input signal at the second intermediate frequency. In this case, a high-performing band-stop filter can in principle be dispensed with.

In order to enable also this embodiment to resort to commercially available components for the evaluation of the signal sent back by the RFID tag, it is likewise advantageous if a first output mixing stage is arranged downstream of the first band-pass filter and a second output mixing stage is arranged downstream of a second band-pass filter.

In principle the first band-pass filter and the second band-pass filter can be coordinated in such way that they—as required—let the respective sidebands of the signal pass, but block the carrier signal. The use of the adjustable oscillators and the input mixing stages, however, permits as a further preferred embodiment that the first band-pass filter and the second band-pass filter are components identical in construction, wherein for this purpose the respective oscillator frequencies need to be adjusted accordingly.

As regards the input mixing stages and the output mixing stages it is in principle merely a matter of adjusting the respective intermediate frequencies to the filter components, i.e. for example the band-stop filter and the band-pass filter, or, respectively, to a evaluation circuit arranged downstream thereof. With respect to commercially available components, however, such embodiments are preferred where the input mixing stages are downconversion mixing stages and/or the output mixing stages are upconversion mixing stages.

To reach a desired intensity for the sidebands of the RFID signal which finally need to be evaluated, at least one amplifying element, in particular at least one separate amplifier, can be provided between the input mixing stage or the input mixing stages and the blocking device.

In principle, amplifying stages may also be provided in the band-stop filter and/or the band-pass filter.

To reduce the intensity of the carrier signal already prior to the entry into the amplifying stages, further embodiments of the inventive circuit are additionally preferred where upstream of the amplifying elements, in particular upstream of the separate amplifiers, at least one input filter, in particular a quartz, is provided for filtering out the carrier signal. In a preferred embodiment e.g. three quartzes are connected in series.

A particularly high variability of the respective adjustable intermediate frequencies is achieved if each mixing stage is connected to a separate adjustable oscillator.

In an embodiment of the invention, however, the output mixing stage or the output mixing stages cooperate with the same oscillator as the input mixing stage or input mixing stages arranged in the same path.

A further important aspect when dimensioning a transmitting/receiving system is the calculation of an input noise power N which is directly proportional to the system bandwidth $\Delta f$. In the case of commercially available systems as a general rule surface acoustic wave filters (SAW filter) are installed which let the operating band pass.

With the invention described in the present specification the effective filter bandwidth can be reduced from the bandwidth of the operating channel to the effective channel bandwidth. Hereby the input noise power may be reduced by a factor ranging between 10 and 100 for RFID systems at 868 MHz and 2.45 GHz, respectively.

The reduction of the filter band width of the SAW filter for the operating band to the frequency selective channel filter results in an improvement of the input noise power by a factor ranging between 10 and 100, depending on whether the RFID System is operating at 868 MHz or at 2.45 GHz with a respective channel bandwidth of up to 500 kHz.

By using a high-performing channel filter for the operating band, the input noise power of the receiver is reduced proportionally to the ratio between the SAW filter for the operating band, such filter installed in accordance with the state of the art, and the bandwidth of the operating channel in accordance with the present invention. As regards RFID systems for the UHF area, the operating band is e.g. 3 MHz in Europe and 28 MHz in the US, whereas the bandwidth of an operating channel is 200 kHz or 500 kHz, respectively, as a consequence of which hereby the input noise power and thus the system dynamics can be improved by a factor of 15 or 56, respectively.

By installing the electric channel filter described herein, in addition to the known possibilities for the suppression of crosstalk between the transmission and the reception path, a frequency selective suppression of the carrier signal in the reception path can be achieved. Respective practical values exceed 40 dB which may result in a more than eightfold increase of the reach of an RFID system in accordance with the backscatter procedure.

On account of the frequency selectivity of the invention it is possible to serve systems with a multi-channel-operation, i.e. to dynamically vary the operating frequency of a system with an individual operation channel in order to keep the frequency offset with respect to disturbers and/or adjacent systems as large as possible.

The invention can be realized with commercially available components and is—with respect to monetary and staff-related investments—considerably cheaper than by realizing it by means of digital signal processing. With respect to a frequency selective filtering by means of a digital signal processing, a response time in a range comparable to that of the electric channel filter described herein, can only be achieved by making an unproportionally high investment in the processing power.

In accordance with a further embodiment of the invention provision is made for a compensation circuit for suppressing the crosstalk between the transmission path and a reception path of an RFID-reader unit, comprising a device for coupling out a signal portion of a carrier signal from the transmission path into a compensation path, the compensation path having at least one variable phase shifter and at least one variable attenuation member for varying the signal portion in the phase and in the amplitude respectively, a device for coupling in the signal portion varied in the phase and in the amplitude from the compensation path onto the reception path, a unit for determining the crosstalk existing in the reception path, and a control unit for the variable phase shifter and the variable attenuation member, which is in signal connection with the unit for determining the existing crosstalk.

With this compensation circuit for the RFID-reader unit the suppression of the crosstalk of the carrier signal on the reception path can be improved in an especially simple, versatile and effective manner in the backscatter method in RFID systems so that a higher system dynamic is rendered possible that results in an increased range or in a lower bit error rate whilst having the same distance between the reader unit and the tag.

According to the invention the compensation path is branched off from the transmission path on the coupling-out device and merges into the reception path on the coupling-in device. The unit for determining the existing crosstalk is also provided on the reception path. For best suitability, the variable phase shifter is connected upstream of the variable attenuation member, i.e. it is arranged closer to the transmission path than the attenuation member.

The control unit can be adapted in such a manner in accordance with the invention that it controls the variable phase shifter and the variable attenuation member as a function of the existing crosstalk, but preferably also as a function of the carrier signal, for example as a function of its frequency. In particular, the control unit can control the variable phase shifter and the variable attenuation member in such a way that the existing crosstalk becomes minimal. For effectiveness, the unit for determining the crosstalk existing in the reception path has a detector.

Through the use of the electric compensation circuit described in this document a frequency-selective suppression of the crosstalk between the transmission and the reception path of a system via a circulator or via two antennas can be achieved, which can bring about an increase in the system dynamic and an improved suppression or isolation. Values that can be realized for improving the isolation amount to over 50 dB.

Owing to the frequency-selective suppression of the crosstalk this circuit can be employed in systems having several transmission channels.

The compensation circuit according to the invention makes use of an analog and dynamic adjustment of the transmission characteristics of a parallel transmission path by means of the control unit, whereby independence of both production tolerances and discrete values of the SMD-components that are perhaps used can be attained.

As a result of the dynamic adjustment of the compensation path, which can be carried out in-between individual read operations, a quick compensation can be achieved thus rendering it possible to compensate for environmental influences, such as larger reflecting surfaces located in proximity to the system or tag, in a dynamic manner during operation.

The compensation circuit can also be employed for an improved isolation between the transmission and reception antennas of an arrangement having two or more antennas.

Another fundamental advantage of the described circuit resides in the improved noise characteristic of the receiver which can be ascribed to the fact that during suppression of the carrier signal the noise caused by this strong signal is suppressed to the same extent.

The transmission path and the reception path can be coupled in an especially simple manner via a circulator to a common antenna. Consequently, it is of advantage that between the transmission path and the reception path a circulator is provided, which leads to at least one transmission/reception antenna, the transmission path being given between a transmission connection and the circulator and the reception path being given between the circulator and a receiving connection.

In a further embodiment of the invention the transmission path and the reception path can be coupled in an especially simple manner via a directional coupler to a common antenna. Consequently, it is of advantage that between the transmission path and the reception path a directional coupler is provided, which leads to at least one transmission/reception antenna, the transmission path being given between a transmission connection and the directional coupler and the reception path being given between the directional coupler and a receiving connection.

Alternatively, an arrangement with two antennas can also be provided, which can reduce the crosstalk even further. Consequently, it is laid down in accordance with the invention that on the transmission path at least one transmission antenna and on the reception path at least one reception antenna is provided, the transmission path being given between a transmission connection and the transmission antenna and the reception path being given between the reception antenna and a receiving connection.

With regard to the complexity of the circuit it is especially preferred that the device for coupling out a signal portion, in particular having a defined power, is a coupler or unsymmetrical power divider and/or that the device for coupling in the signal portion varied in the phase and in the amplitude is a coupler or unsymmetrical power divider.

In addition, in an embodiment, the unit for determining the crosstalk existing in the reception path has a further coupler or unsymmetrical power divider and/or a power detector. Advantageously, the unit for determining the existing crosstalk, more particularly its coupler or unsymmetrical power divider, is arranged on the reception path, namely by preference between the device for coupling in the signal portion varied in the phase and in the amplitude and the receiving connection.

The production work involved can be reduced further in that at least one of the couplers or unsymmetrical power dividers is set up by coupled lines or through the use of SMD-components.

To achieve in particular an even further improved suppression of the crosstalk whilst ensuring a minimum of production work involved provision can be made for at least one fixed phase shifter and/or at least one fixed attenuation member to be arranged in the compensation path. These fixed elements can serve for adjustment of the phase or amplitude of the coupled out signal portion to the dynamic range of the variable phase shifter and/or the variable attenuation member. It is useful for the fixed modules to precede the variable modules, i.e. they are arranged in the compensation path between the device for coupling out the signal portion and the variable modules.

In addition it is of advantage that at least one amplifier unit is arranged in the compensation path. The amplifier unit can serve to compensate for changes in the amplitude of the coupled out carrier signal, which can arise for instance due to the coupling factors of the couplers. Advantageously, the amplifier unit is arranged in the compensation path between the variable elements and the device for coupling in the signal portion varied in the phase and in the amplitude. By preference, the control unit also serves to control the amplifier unit in the compensation path.

Another advantageous embodiment of the invention resides in the fact that an amplifier unit, optionally having an integrated regulation of the amplification (automatic gain control), is employed before the power detector. As a result, the dynamic measurement range of the power detector can be increased. This amplifier unit is part of the unit for determining the existing crosstalk and/or is arranged between the coupler or power divider of this unit and the power detector of this unit.

For best suitability, the power detector is constituted by an integrated semiconductor circuit (a so-called integrated circuit, IC).

It is especially advantageous that the control unit is adapted such that it adjusts the compensation path, i.e. in particular the variable phase shifter and the variable attenuation member and perhaps also the amplifier unit of the compensation path, in-between individual read operations of the RFID-reader unit. Another embodiment of the invention resides in the fact that the control unit is adapted such that the variable phase shifter and the variable attenuation member iteratively run through different combinations of attenuation and phase values, and after a run-through the range of values of attenuation and phase is restricted around a best value determined in the run-through for the crosstalk and/or a discretization of the attenuation and phase values is refined.

The invention also relates to an RFID-reader unit having a compensation circuit in accordance with the invention. In principle, the compensation circuit according to the invention can also be employed in other transmission/reception circuits.

In the present application a dynamic adjustment network is described for use in RFID-systems, in particular having an electric circulator, for generating a frequency-selective suppression of the crosstalk that develops via the circulator. The frequency-selective suppression of the crosstalk leads to the fact that the sidebands, which lie in the frequency spectrum around the carrier signal and contain the tag response, are no longer superimposed by the strong crosstalk, which in turn leads to an increase in the system dynamic by the additionally achieved suppression. This additionally achieved system dynamic results, for its part, in an increased range or alternatively in an improved signal-noise-distance (or a lower bit error rate) at the same range.

The frequency-selective suppression is effected by a destructive superimposition of the crosstalk with a coupled-out portion of the transmission signal, whose amplitude and phase are set for the operating frequency by means of
fixed and/or variable phase shifters,
fixed and/or variable attenuation members,
and an optional amplifier unit.

The coupling elements needed for coupling in and coupling out the compensation signal can be realized both by lumped and distributed elements. Through the use of an optional power detector connected via a coupler or an unsymmetrical power divider the degree of suppression can be determined and used as an input value of a control unit.

In addition to compensating for the crosstalk arising via the circulator between the transmission and reception path the compensation circuit can also serve to compensate for environmental influences on the antenna input reflection that are caused e.g. by larger, strongly reflecting surfaces in proximity to the operation unit and may also lead to a restriction of the system dynamic.

The compensation circuit can also be employed in systems, in which two separate antennas are used for transmission and reception.

In accordance with the invention a compensation circuit for suppressing the crosstalk between the transmission connection and the receiving connection via a circulator leading to at least one transmission/reception antenna can be provided, the circuit consisting of a coupler or unsymmetrical power divider for coupling out a defined power of the carrier signal between the transmission connection and the circulator, a compensation path consisting of at least one variable phase shifter and one variable attenuation member, a coupler or unsymmetrical power divider for coupling in the signal portion of the carrier signal, which has been varied in amplitude and phase in the compensation path, onto the path between the circulator and the receiving connection, a unit for determining the existing crosstalk, which can consist of a further coupler or unsymmetrical power divider and a power detector, as well as a control unit.

Furthermore, in accordance with the invention a compensation circuit for suppressing the crosstalk between the transmission connection and the receiving connection via at least one transmission antenna and at least one reception antenna can be provided, the circuit consisting of a coupler or unsymmetrical power divider for coupling out a defined power of the carrier signal between the transmission connection and the transmission antenna, a compensation path consisting of at least one variable phase shifter and one variable attenuation member, a coupler or unsymmetrical power divider for coupling in the signal portion of the carrier signal, which has been varied in amplitude and phase in the compensation path, onto the path between the reception antenna and the receiving connection, a unit for determining the existing crosstalk, which can consist of a further coupler or unsymmetrical power divider and a power detector, as well as a control unit.

Another idea of the invention resides in the fact that the couplers or unsymmetrical power dividers are set up by coupled lines or through the use of SMD-components.

Moreover, in accordance with the invention at least one fixed phase shifter and/or one fixed attenuation member is used in the compensation path in order to adjust the phase or amplitude of the coupled out carrier signal to the dynamic range of the variable phase shifter or the variable attenuation member.

A further aspect of the invention resides in the fact that an amplifier unit is used in the compensation path in order to compensate for the changes in the amplitude of the coupled out carrier signal that arise for example from the coupling factors of the couplers.

Moreover, in a compensation circuit according to the invention for suppressing the crosstalk between the transmission connection and the receiving connection an amplifier unit, optionally having an integrated regulation of the amplification (automatic gain control), can be employed before the power detector so as to increase the dynamic measurement range of the detector. Besides, the detector can be replaced by an integrated semiconductor circuit (so-called integrated circuit, IC).

The combination of a variable attenuation member and an amplifier can in a simple variant be realized by an amplifier with variable amplification.

BRIEF DESCRIPTION OF THE DRAWINGS

Further advantages and features of the invention will be described below referring to the attached figures.

DETAILED DESCRIPTION OF THE INVENTION

Figure 1:
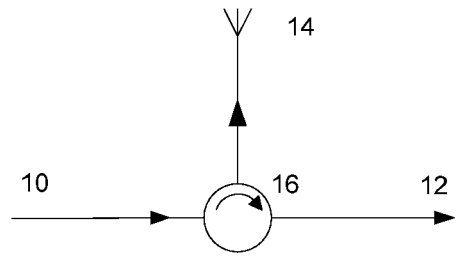
FIG. 1 depicts a circulator used in combination with the inventive filtering circuit.

FIG. 1 shows a schematic illustration of a circuit in accordance with the state of the art for the realization of a transmission/receiving passage for a duplex operation required for a backscatter procedure, thereby using a circulator. The reader arrangement illustrated therein comprises a transmission connection 10, an antenna 14, a receiving connection 12 and a circulator 16 which is located between the transmission connection 10 and the receiving connection 12.

Figure 2:
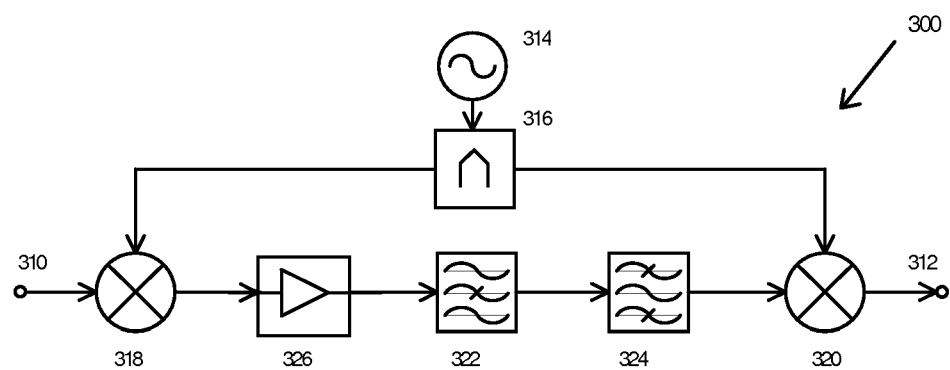
FIG. 2 depicts a first embodiment of an inventive filtering circuit.

FIG. 2 shows an electrically adjustable circuit for filtering a transmission channel of an RFID signal with suppression of the carrier signal in the reception path between the input gate 310 and the output gate 312 comprising a. at least one oscillator 314 for generating a signal required for the mixing procedures,
b. at least one power divider 316 for dividing the oscillator signal,
c. at least two mixing stages 318 and 320, wherein the downconversion mixing stage 318 intermixes the input signal to an intermediate frequency and the upconversion mixing stage 320 upmixes the filtered signal from the intermediate frequency to the original frequency position,
d. a high-performing band-stop filter 322 for suppressing the carrier signal at the intermediate frequency,
e. a high-performing band-pass filter 324 for filtering the operating channel at the intermediate frequency
f. as well as an optional low-noise amplifier stage 326 which improves the total noise figure of the circuit and compensates the conversion losses arising at the mixing procedures, wherein the order of the filtering through the band-stop filter 322 and the band-pass filter 324 is interchangeable.

The supply of the second mixing stage by the oscillator 314 via the signal divider 316 can be dispensed with or such supply be substituted by a second oscillator.

FIG. 2 schematically shows the arrangement of an embodiment of the electrically adjustable channel filter in accordance with the invention which comprises at least one adjustable oscillator 314, at least one signal divider 316 and at least two mixing stages 318 and 320. The input signal of the input connection 310 is mixed down with an oscillator signal of the adjustable oscillator 314 at a downconversion mixing stage 318 for processing to an intermediate frequency and at the upconversion mixing stage 320 is then again mixed up to the operating frequency. At the intermediate frequency the carrier signal is suppressed by a high-performing band-stop filter 322 and the respective operating channel is filtered through a band-pass filter 324. Optionally, an amplification of the signal may be carried out by an amplifying stage 326.

The band-stop filter 322 and the band-pass filter 324 have constant frequencies. The object of the mixing stages is to intermix the individual operating channels to the intermediate frequency and then again upmix the filtered signals of the intermediate frequency to the original frequency position.

The order of the filtering and the amplification is principally interchangeable. However, it is recommended to prefer the amplification by means of a low-noise amplifier as shown in FIG. 2, since hereby the resulting total noise figure is reduced and thus the signal-noise-ratio is improved.

A further embodiment of the invention is to dispense with the second mixing stage and carry out the further evaluation of the tag response at the intermediate frequency.

Furthermore it is possible to lead a second oscillator signal to the second mixing stage to mix the signal at the output of the circuit to a further, optional intermediate frequency. The further evaluation of the tag response can then be carried out on this second intermediate frequency.

Figure 3:
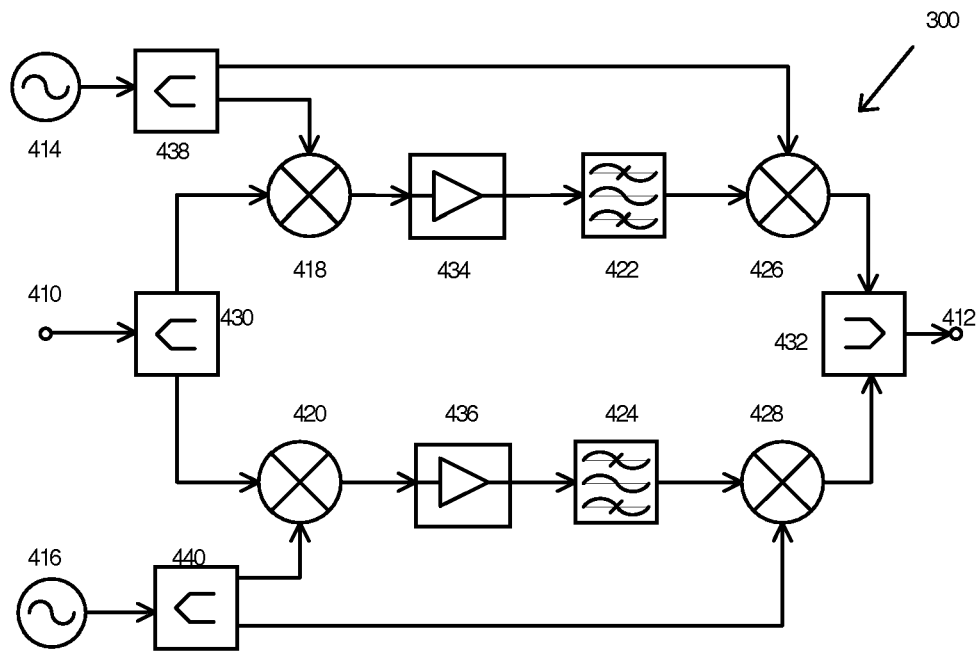
FIG. 3 depicts a second embodiment of an inventive filtering circuit.

In a simplified illustration FIG. 3 shows an alternative realization of an inventive electrically adjustable circuit for filtering a transmission channel of an RFID signal with suppressing the carrier signal in the reception path between the input gate 410 and the output gate 412, realized by the filtering of the two sidebands of the tag response around the carrier signal through two band-pass filters at an intermediate frequency, comprising a. at least one power divider 430 for dividing the input performance between the two paths for filtering the individual sidebands,
b. at least one oscillator 414 for the generation of a signal required for one of the mixing procedures at the first (e.g. upper) sideband,
c. at least one power divider 438 for dividing the oscillator signal from the oscillator 414 between the mixing stages for the first (e.g. upper) sideband,
d. at least two mixing stages 418 and 426 for relocating the first signal fraction to the intermediate frequency and back to the frequency range of the input signal,
e. at least one high-performing band-pass filter 422 to filter the first (e.g. upper) sideband,
f. an optional low-noise amplifier stage 434 for reducing the total noise figure of the circuit as well as for compensating the conversion losses arising at the mixing procedures when processing the first (e.g. upper) sideband,
g. at least one oscillator 416 for the generation of a signal required for the mixing procedures at the second (e.g. upper) sideband,
h. at least one power divider 440 for dividing the oscillator signal from the oscillator 416 between the mixing stages for the second (e.g. lower) sideband, i. at least two mixing stages 420 and 428 for relocating the second signal fraction to the intermediate frequency and back to the frequency range of the input signal, j. at least one high-performing band-pass filter 424 to filter the second (e.g. lower) sideband, k. an optional low-noise amplifier stage 436 for reducing the total noise figure of the circuit as well as for compensating the conversion losses arising at the mixing stages when processing the second (e.g. lower) sideband l. as well as at least one power divider 432, which brings together the two filtered sidebands located at the frequency range of the input signal.

The embodiment shown in FIG. 3 can either dispense with the supply of the second mixing stage of the respective signal path by means of the oscillators 414 and 416 via the signal dividers 438 and 440 or they can each be replaced by further oscillators.

In the embodiment as shown in FIG. 3 a separated filtering of the two sidebands of the tag response between the input gate 410 and the output gate 412 is carried out. For this purpose the input signal is divided via at least one signal divider 430 between the two signal paths. The oscillator signal required for the mixing at a downconversion mixing stage 418 and an upconversion mixing stage 426 for the mixing in the first signal path, in which, for example, the lower sideband can be filtered, is made available by an oscillator 414 via a signal divider 438. The filtering of the first sideband is effected via the high-performing band-pass filter 422 wherein the signal level may optionally be increased by a (low-noise) amplifying stage 434.

The same principle is followed when on the second signal path a filtering of the second sideband through the high-performing filter 424 is effected with an optional amplification by a (low-noise) amplifying stage 436. The oscillator signal required at the downconversion mixing stage 420 and the upconversion mixing stage 428 is generated by an oscillator 416 via a signal divider 440. By bringing together the two filtered sidebands from the two signal paths at a signal divider 432, a signal is generated which basically consists of the two sidebands or the tag response, respectively.

As far as this embodiment is concerned, the filterings of the respective sidebands can be effected at the same intermediate frequency, whereby the same electric components may be used for the first and the second path.

Also with respect to this realization, by the employment of further oscillators for the second mixing stage of the respective sideband an evaluation of the tag response can be carried out at an optional intermediate frequency.

Figure 4:
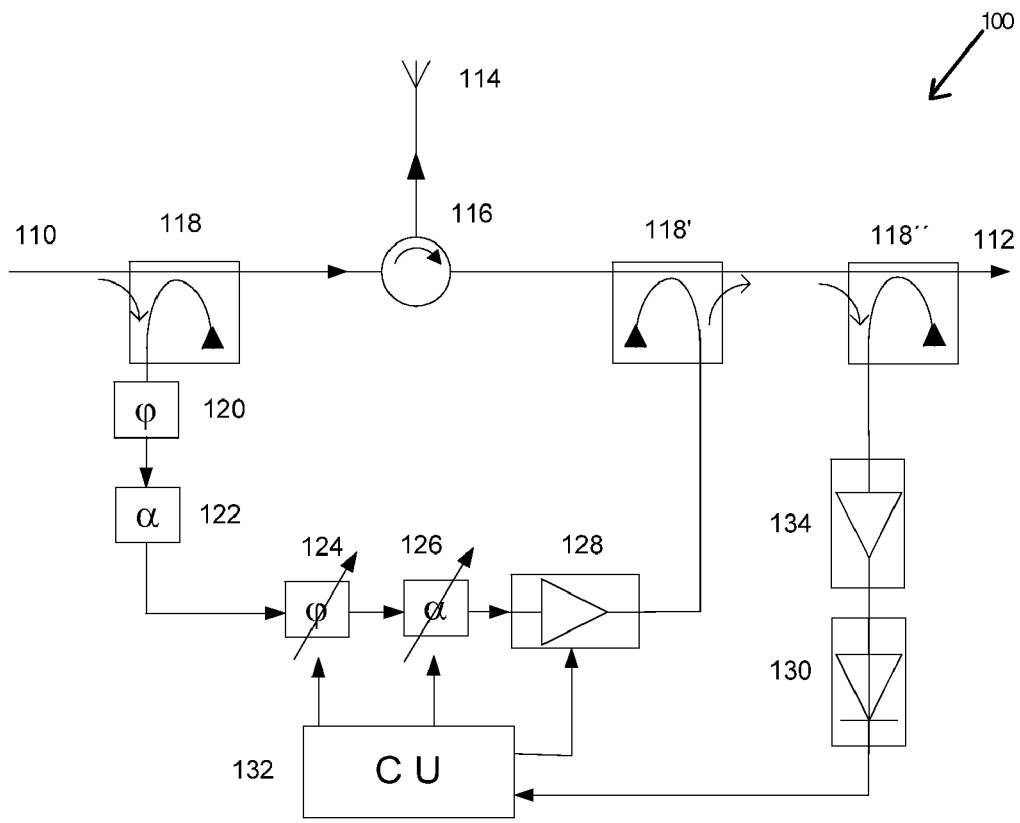
FIG. 4 shows the architecture of an electric compensation circuit according to the invention consisting of coupling elements, fixed and variable phase shifters and attenuation members, an amplifier unit, a detector for measuring the entire crosstalk and a central control unit for suppressing the crosstalk of the transmission signal via a circulator and the transmission/reception antenna on the reception path.

In FIG. 4 a schematically simplified construction of an embodiment of the electric circulator according to the invention is shown. The embodiment comprises at least one coupler 118 that couples out a defined portion of the power of the carrier signal between the transmission connection 110 and at least one circulator 116 onto a parallel running compensation path. Furthermore, it comprises at least one coupler 118' which serves for coupling in a defined portion of the power of the signal manipulated in amplitude and phase from the compensation path onto the reception path between the circulator 116 leading to the transmission and reception antenna 114 and the receiving connection 112. In addition, a unit is provided consisting of at least one coupler 118'' which couples out a defined portion of the power between the coupler 118' and the receiving connection 112, and of at least one further component, such as e.g. a detector 130, for determining the achieved suppression on the basis of the power on hand, in which case the further component passes the determined power level on to a control unit 132.

In accordance with this embodiment of the electric circulator the undesired crosstalk is superimposed by a signal having the same amplitude but being shifted by 180°. For this purpose a defined portion of the carrier signal, which has been coupled out via the coupler 118 and originates from the transmission connection 110, is varied in amplitude and phase by at least one variable phase shifter 124, at least one variable attenuation member 126 and by at least one amplifier unit 128 such that the superimposition of this signal via the coupler 118' with the crosstalk present via the circulator 116 and the transmission/reception antenna 114 cancels the crosstalk or at least compensates it up to a value lying below the sensitivity of the reception unit.

The couplers or unsymmetrical power dividers 118, 118' and 118'' can be realized by means of lumped components or so-called SMDs (surface mounted devices). Alternatively, these couplers can be realized by distributed elements or coupled conductor segments.

In addition to the variable phase shifter 124, which can consist of both switchable components with discrete values and for example voltage-controlled chips with analog values, at least one fixed phase shifter 120 can be used to adjust the phase position of the coupled-out signal portion to the dynamic range of the variable phase shifter. Such fixed phase shifters 120 can be designed as prefabricated chips, SMD-components or as circuit elements.

Likewise, in addition to the variable attenuation member 126, which can consist of both switchable components with discrete values and for example voltage-controlled chips with analog values, at least one fixed attenuation member 122 can be used to adjust the amplitude position of the coupled-out signal portion to the dynamic range of the variable attenuation member 126. Such fixed attenuation members 122 can be designed for example as individual chips or as SMD-components.

The task of the control unit 132 is to evaluate the crosstalk determined by the power detector 130 and to set the parameters required for suppression with regard to phase and amplitude of the individual modules 124, 126 on the compensation path. A possible algorithm for determining a good suppression of the crosstalk of the carrier signal onto the reception path resides in the iterative running-through of different combinations of attenuation and phase values by the variable phase shifter 124 and the variable attenuation member 126, and with each run-through the range of values of the respective settable variables is restricted around the best value and discretization is refined.

To enlarge the dynamic range of the power detector 130 an amplifier unit 134 consisting of at least one amplifier, optionally having a self-regulating amplification (so-called automatic gain control), can be employed.

Figure 5:
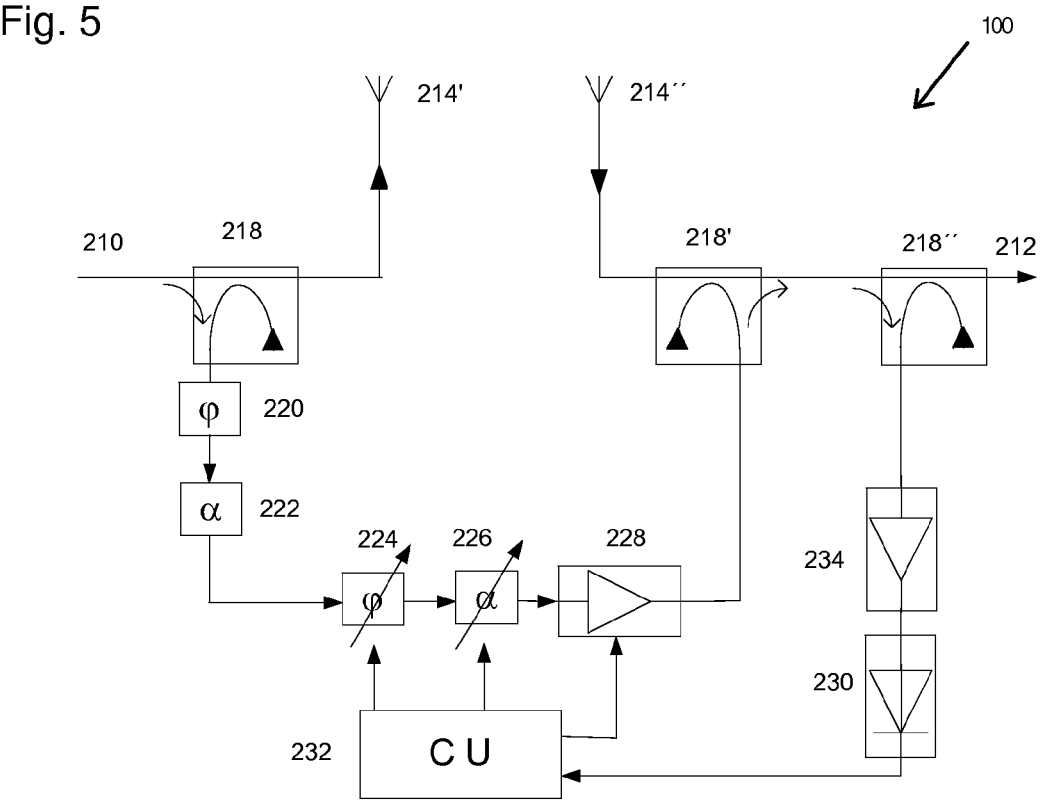
FIG. 5 shows the architecture of an electric compensation circuit according to the invention consisting of coupling elements, fixed and variable phase shifters and attenuation members, an amplifier unit, a detector for measuring the entire crosstalk and a central control unit for suppressing the crosstalk between a transmission antenna and a reception antenna on the reception path.

FIG. 5 shows an alternative design of the invention. In this case the circulator and the combined transmission/reception antenna, which are employed in the front-end in order to implement the duplex operation needed in the backscatter method, are replaced by an antenna arrangement consisting of two separate antennas 214', 214'' for the transmission and the reception signal, respectively.

In this case the crosstalk between the two antennas 214', 214'' can be compared to the crosstalk via the circulator and can be suppressed in the same way by making use of the electric compensation circuit described in this document.

Figure 6:
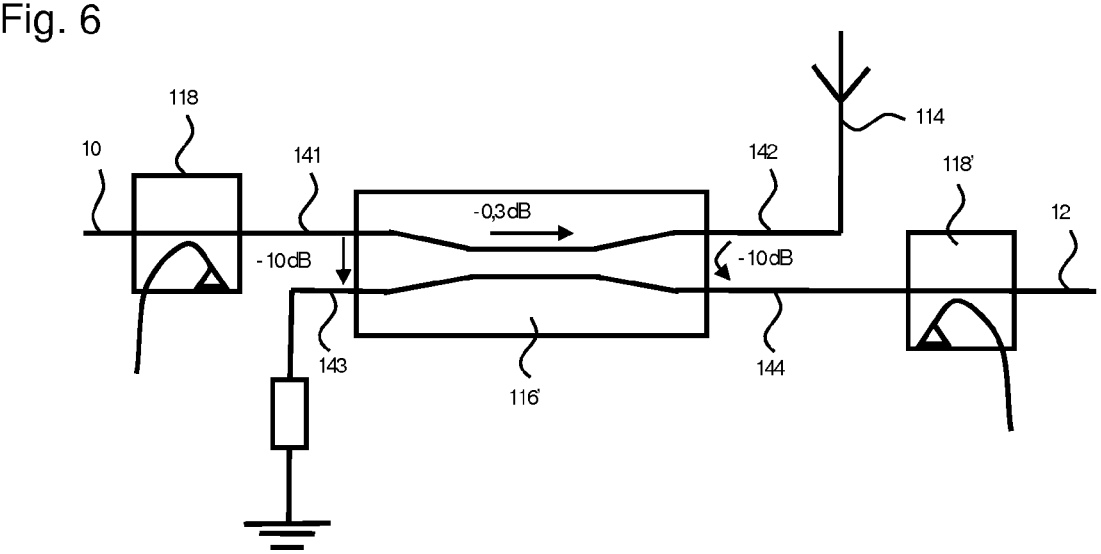
FIG. 6 shows in a partial view the architecture of an alternative embodiment of the invention where a directional coupler is used.

FIG. 6 shows schematically how a directional coupler 116' can be used instead of a circulator. The input signal is fed to a first connection 141 of the directional coupler 116' from where it is coupled with a slight loss of −0.3 dB to a second connection 142. With a loss of −10 dB the input signal is furthermore coupled from the first connection 141 to a third connection 143. The third connection 143 is connected to ground potential by a resistor in such a way that, there, no reflections occur. Finally, the signal coming from the antenna 114 is coupled in the example shown with a loss of −10 dB to a forth connection 144 of the directional coupler 116'. In all other aspects, this embodiment is constructed in the same way as the variants described above. For clarity reasons, the further components are omitted in FIG. 6.

Figure 7:
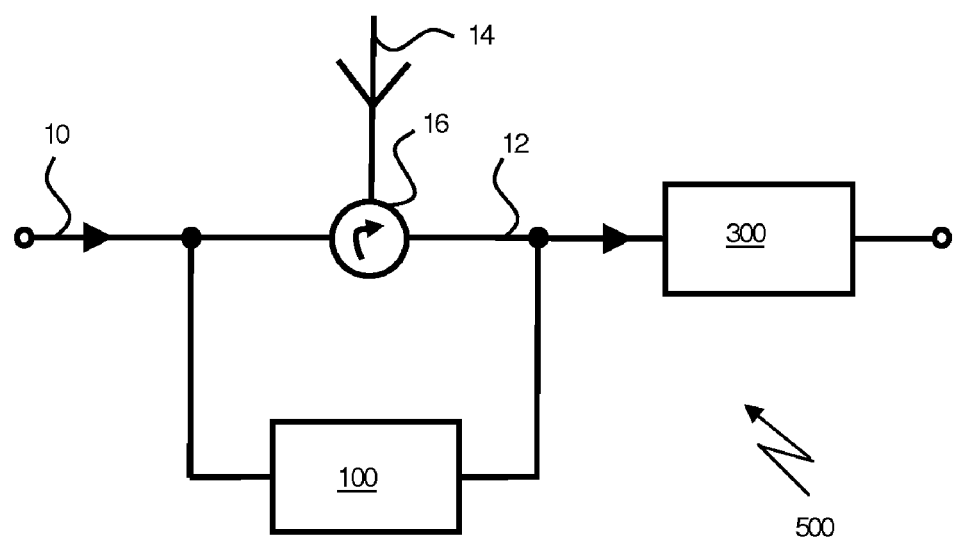
FIG. 7 shows diagrammatically an embodiment of an RFID reader device in accordance with the invention.

FIG. 7 shows diagrammatically a RFID-Reader device 500 according to the invention. It comprises a filtering circuit 300 in accordance with the invention which is connected to the output 12 of the circulator 16. To minimize crosstalk from the input 10 to the output 12 of the circulator 16 a compensation circuit 100 as also described in detail above is connected parallel to the circulator 16.

In all figures equivalent components carry the same numerals.

The present specification discloses a filter circuit, which is adjustable in the frequency position, for suppressing a carrier signal existent in the RFID backscatter procedure, which at the same time permits a filtering of the operating channel through a high-performing band-pass filter.

Because of the suppression of the carrier signal at up to 40 dB, the range of the RFID system may be increased by more than eightfold, or the bit error ratio be improved at a constant distance.

Due to the frequency selectivity of the filtering the circuit described herein may be installed in RFID systems with a multi-channel operation. With respect to systems with a single operating channel the frequency range of the carrier signal may be dynamically modified to permit a larger frequency offset with respect to other adjacent systems or potential disturbers.

The analogue circuit arrangement based on components of mass electronics ensures a fast signal processing as well as an inexpensive realization.

The electrically adjustable channel filter with carrier suppression as described in the present specification combines a frequency selective analogue carrier suppression with a filtering of the operating channel and may—in addition to the approaches as described above—be employed for an improved carrier suppression in the reception path. The improvement of the carrier suppression results in a proportional enhancement of the system dynamics and, consequently, to an increased reach and/or an improved bit error ratio. Concurrently, the input noise power is reduced and thus the receiver sensitivity and the signal-noise-ratio is improved.

The invention described in the present specification permits a suppression of the crosstalk of the carrier signal in the reception path in combination with a simultaneous frequency selective filtering of the operating channel, which is particularly required with respect to a multireader environment. Hereby the system dynamics is increased by the hereby generated suppression of the carrier signal, which results in an increase of the reach or in an improvement of the bit error ratio at the same distance.

The invention claimed is:

1. Adjustable circuit for filtering of a transmission channel of an RFID signal and for suppression of a carrier signal in a reception path between an input gate and an output gate,
    with at least one adjustable oscillator for generation of an oscillator signal,
    with at least one input mixing stage cooperating with the oscillator for mixing of an input signal by the oscillator signal to an intermediate frequency, and
    with a blocking device which is arranged downstream of the at least one input mixing stage for suppression of the carrier signal at the intermediate frequency,
    wherein
    the blocking device has a first band-pass filter for filtering of a first sideband of the input signal and a second band-pass filter for filtering of a second sideband of the input signal, and
    wherein
    a power divider is provided for division of an input signal between a first path and a second path,
    that at least one first adjustable oscillator is provided for generation of a first oscillator signal,
    that in the first path a first input mixing stage cooperating with the first oscillator is provided for mixing of the input signal by the first oscillator signal to a first intermediate frequency,
    that the first band-pass filter is arranged downstream of the first input mixing stage for filtering of the first sideband of the input signal at the first intermediate frequency,
    that in the second path a second input mixing stage cooperating with the first oscillator or a second oscillator for mixing of the input signal by the oscillator signal to a second intermediate frequency, and
    that the second band-pass filter is arranged downstream of the second input mixing stage for filtering of the second sideband of the input signal at the second intermediate frequency.

2. Circuit according to claim 1,
wherein
the blocking device has a band-stop filter.

3. Circuit according to claim 2,
wherein
for the filtering of the transmission channel at the intermediate frequency a band-pass filter is present.

4. Circuit according to claim 3,
wherein
the band-pass filter is arranged downstream of the band-stop filter.

5. Circuit according to claim 2,
wherein
at least one output mixing stage is arranged downstream of the band-stop filter.

6. Circuit according to claim 1,
wherein
a first output mixing stage is arranged downstream of the first band-pass filter, and
a second output mixing stage is arranged downstream of the second band-pass filter.

7. Circuit according to claim 1,
wherein
the first band-pass filter and the second band-pass filter are identical in construction.

8. Circuit according to claim 1,
wherein
between the at least one input mixing stage and the blocking device at least one amplifying element is provided.

9. Circuit according to claim 1,
wherein
between the at least one input mixing stage and the blocking device at least one separate amplifier is provided.

10. Circuit according to claim 1,
wherein
the at least one input mixing stage is a downconversion mixing stage.

11. Circuit according to claim 5, wherein the at least one output mixing stage is an upconversion mixing stage.

12. Circuit according to claim 8, wherein at least one input filter is provided in each case upstream of the at least one amplifying element for filtering out the carrier signal.

13. Circuit according to claim 8, wherein at least one quartz is provided in each case upstream of the at least one amplifying element for filtering out the carrier signal.

14. Circuit according to claim 5, wherein the at least one output mixing stage cooperates with the same oscillator as the at least one input mixing stage arranged in the same path.

15. RFID reader device with a circuit according to claim 1.

16. RFID-reader device according to claim 15, wherein a compensation circuit is provided for suppressing the crosstalk between a transmission path and a reception path of an RFID-reader unit, comprising
a device for coupling out a signal portion of a carrier signal from the transmission path into a compensation path,
the compensation path having at least one variable phase shifter and at least one variable attenuator for varying the signal portion in phase and in amplitude, respectively,
a device for coupling in the signal portion varied in the phase and in the amplitude from the compensation path onto the reception path,
a unit for determining the crosstalk existing in the reception path,
and a control unit for the variable phase shifter and the variable attenuator, which is in signal connection with the unit for determining the existing crosstalk.

17. RFID-reader device according to claim 16, wherein between the transmission path and the reception path a circulator is provided that leads to at least one transmission/reception antenna, the transmission path being given between a transmission connection and the circulator and the reception path being given between the circulator and a receiving connection.

18. RFID-reader device according to claim 16, wherein on the transmission path at least one transmission antenna and on the reception path at least one reception antenna is provided, the transmission path being given between a transmission connection and the transmission antenna and the reception path being given between the reception antenna and a receiving connection.

19. RFID-reader device according to claim 16, wherein the device for coupling out a signal portion is a coupler, and wherein the device for coupling in the signal portion varied in the phase and in the amplitude is a coupler.

20. RFID-reader device according to claim 16, wherein the device for coupling out a signal portion is an unsymmetrical power divider, and wherein the device for coupling in the signal portion varied in the phase and in the amplitude is an unsymmetrical power divider.

21. RFID-reader device according to claim 16, wherein the unit for determining the crosstalk existing in the reception path has a further coupler and a power detector.

22. RFID-reader device according to claim 16, wherein the unit for determining the crosstalk existing in the reception path has a further unsymmetrical power divider and a power detector.

23. RFID-reader device according to claim 16, wherein in the compensation path at least one of a fixed phase shifter and a fixed attenuator is arranged.

24. RFID-reader device according to claim 16, wherein in the compensation path at least one amplifier unit is arranged.

25. RFID-reader device according to claim 21, wherein an amplifier unit is employed before the power detector.

26. RFID-reader device according to claim 21, wherein an amplifier unit having an integrated regulation of the amplification is employed before the power detector.

27. RFID-reader device according to claim 16, wherein the control unit is adapted such that it adjusts the compensation path in-between individual read operations of the RFID-reader unit, and the control unit is adapted such that the variable phase shifter and the variable attenuator iteratively run through different combinations of attenuation and phase values, and after a run-through the range of values of attenuation and phase is restricted around a best value determined in the run-through for the crosstalk and a discretization of the attenuation and phase values is refined.

* * * * *